April 28, 1925.

E. M. POONS

BRAID FOR HATS

Filed Oct. 19, 1922

INVENTOR

ATTORNEYS

Patented Apr. 28, 1925.

1,535,683

UNITED STATES PATENT OFFICE.

EDWARD M. POONS, OF NEW YORK, N. Y.

BRAID FOR HATS.

Application filed October 19, 1922. Serial No. 595,638.

*To all whom it may concern:*

Be it known that I, EDWARD M. POONS, a citizen of the United States, and resident of the borough of Manhattan, in the city and State of New York, have invented a new and useful Improvement in Braids for Hats, of which the following is a specification.

The object of my invention is to produce a novel braid especially designed for use in the making of hats, which braid is composed of plaited strands of straw and bamboo leaf, preferably in their natural or undyed state, thereby producing a braid of permanently contrasting colors which will be very attractive, strong and durable and well adapted for the purpose intended.

A practical embodiment of my invention is represented in the accompanying drawing, in which Fig. 1 represents my new braid in plan.

Figure 1:
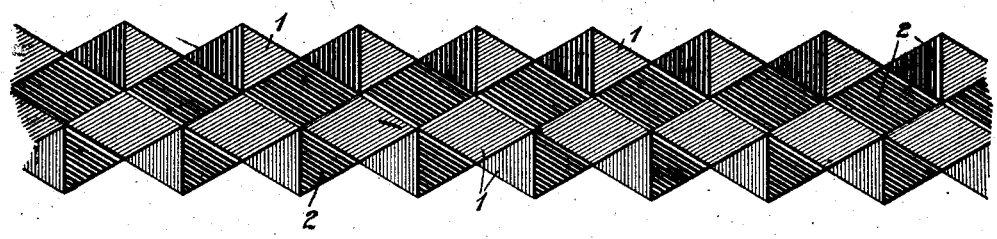
Figure 2:
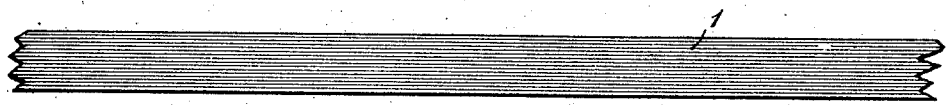
Fig. 2 represents the straw strand.
Figure 3:
Fig. 3 represents the bamboo leaf strand.

The straw strand is denoted by 1 and the bamboo leaf strand is denoted by 2, which strands are preferably left in their natural or undyed state, so that when they are plaited together they will form a braid as shown in Fig. 1, of contrasting colors of a permanent nature which will not be affected by the elements, the braid at the same time not only being very attractive but also very strong and durable, rendering it especially applicable for use in the manufacture of hats.

What I claim is:—

A braid comprising plaited strands of straw and bamboo leaf in their natural or undyed state.

In testimony, that I claim the foregoing as my invention, I have signed my name this 17th day of October, 1922.

EDWARD M. POONS.